(12) United States Patent
Negishi et al.

(10) Patent No.: US 8,385,298 B2
(45) Date of Patent: Feb. 26, 2013

(54) WIRELESS COMMUNICATION SYSTEM, CONTROL CENTER, AND BASE STATION

(75) Inventors: Kazuya Negishi, Fuchu (JP); Keiji Yamamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 358 days.

(21) Appl. No.: 12/700,247

(22) Filed: Feb. 4, 2010

(65) Prior Publication Data
US 2010/0232399 A1 Sep. 16, 2010

(30) Foreign Application Priority Data
Mar. 10, 2009 (JP) .................. 2009-056932

(51) Int. Cl.
*H04J 3/00* (2006.01)
(52) U.S. Cl. ........ 370/336; 455/436; 455/446; 455/450; 455/452.2; 455/509; 455/511; 455/434; 455/435; 455/522; 455/515; 370/232; 370/235; 370/322; 370/329; 370/330; 370/331; 370/458
(58) Field of Classification Search .................. None
See application file for complete search history.

(56) References Cited

U.S. PATENT DOCUMENTS

| | | | |
|---|---|---|---|
| 7,069,039 B2 * | 6/2006 | Shinozaki | 455/522 |
| 2002/0022482 A1 * | 2/2002 | Ishikawa | 455/434 |
| 2002/0055367 A1 * | 5/2002 | Hamabe et al. | 455/522 |
| 2004/0185852 A1 * | 9/2004 | Son et al. | 455/438 |
| 2006/0079263 A1 * | 4/2006 | Kondo | 455/522 |

FOREIGN PATENT DOCUMENTS

| | | |
|---|---|---|
| JP | 8-9447 | 1/1996 |
| JP | 9-233521 | 9/1997 |
| JP | 2002-010314 | 1/2002 |
| JP | 2003-319445 | 11/2003 |
| JP | 2005-020053 | 1/2005 |
| JP | 2005-328152 | 11/2005 |
| JP | 2006-86631 | 3/2006 |
| JP | 2006-339925 | 12/2006 |

OTHER PUBLICATIONS

Notice of Reasons for Rejection for Application No. 2009-056932, from the Japanese Patent Office, mailed Jan. 18, 2011.

* cited by examiner

*Primary Examiner* — Patrick Edouard
*Assistant Examiner* — Shantell L Heiber
(74) *Attorney, Agent, or Firm* — Finnegan, Henderson, Farabow, Garrett & Dunner, L.L.P.

(57) ABSTRACT

The base station includes a notification module configured to notify a control center of output power data, a measurement module configured to measure a reception quality of each time slot from received radio signals of control data transmitted from other base stations via a control channel, and a transmission module configured to transmit reception quality data indicating the reception quality to the control center, along with data indicating the time slot selected by the base station. The control center includes a reception module configured to receive the output power data, the reception quality data, and the data indicating the time slot, and a construction module configured to construct adjacent base station data indicating adjacency relationship between the base stations by comparing the reception quality and the output power of each of the base stations, the reception quality being obtained by converting the reception quality data based on the time slot.

11 Claims, 10 Drawing Sheets

| CS21 | | |
|---|---|---|
| Base station | Output power | Received powe |
| CS23 | 40 | 10 |
| CS24 | 40 | 30 |
| CS25 | 40 | 20 |
| | | |

FIG. 5B

| CS22 | | |
|---|---|---|
| Base station | Output power | Received power |
| CS24 | 40 | 5 |
| CS25 | 40 | 20 |
| CS26 | 40 | 11 |
| CS27 | 40 | 10 |

| Mobile terminal | Current base station | Base station one station before | Base station two stations before |
|---|---|---|---|
| PS1 | CS23 | CS28 | |
| ... | | | |
| ... | | | |

⬇ After movement of terminal

| Mobile terminal | Current base station | Base station one station before | Base station two stations before |
|---|---|---|---|
| PS1 | CS26 | CS22 | CS25 |
| ... | | | |
| ... | | | |

| CS21 | | |
|---|---|---|
| Base station | Output power | Error rate |
| CS23 | 40 | $1 \times 10^{-9}$ |
| CS24 | 40 | $5 \times 10^{-6}$ |
| CS25 | 40 | $1 \times 10^{-12}$ |
| | | |

FIG. 10B

| CS22 | | |
|---|---|---|
| Base station | Output power | Error rate |
| CS24 | 40 | $1 \times 10^{-8}$ |
| CS25 | 40 | $4.5 \times 10^{-4}$ |
| CS26 | 40 | $3 \times 10^{-6}$ |
| CS27 | 40 | $1 \times 10^{-9}$ |

F I G. 11

WIRELESS COMMUNICATION SYSTEM, CONTROL CENTER, AND BASE STATION

CROSS-REFERENCE TO RELATED APPLICATIONS

This application is based upon and claims the benefit of priority from prior Japanese Patent Application No. 2009-056932, filed Mar. 10, 2009, the entire contents of which are incorporated herein by reference.

BACKGROUND OF THE INVENTION

1. Field of the Invention

The present invention relates to a wireless communication system, a control center, and a base station for providing a wireless communication service to a mobile terminal.

2. Description of the Related Art

In a personal handy-phone system (PHS), a cell site design is not performed when a base station is installed. Accordingly, the positional relationship between base stations must be measured by a person. Further, since a large number of microcells are used as base stations in the PHS system, the measurement takes longer time.

In view of the circumstances, Jpn. Pat. Appln. KOKAI Publication No. 2006-86631, Jpn. Pat. Appln. KOKAI Publication No. 9-233521, and Jpn. Pat. Appln. KOKAI Publication No. 8-9447 disclose approaches of constructing data (adjacent base station data) indicating adjacency relationship between base stations at the time of hand-over of a mobile terminal or switch of a waiting base station. In these approaches, however, since the construction of data on adjacent base stations depends on terminals, an enormous amount of time is required so as to construct adjacent base station data. Further, when the range in which mobile terminals move is limited, the adjacent base station data to be generated will be local and wide-scale adjacent base station data cannot be constructed.

BRIEF SUMMARY OF THE INVENTION

According to an aspect of the present invention, it is provided that a wireless communication system including a plurality of base stations and a control center, the base station being configured to transmit control data used to service a mobile terminal via a control channel in a time slot selected from plurality of time slots autonomously, the control center being configured to connect to the base station via a transmission path and control the base station, the base station including: a notification module configured to notify the control center of output power data via the transmission path, the output power data indicating an output power of the base station; a measurement module configured to measure a reception quality of each time slot from received radio signals of control data transmitted from other base stations via the control channel; and a transmission module configured to transmit reception quality data indicating the reception quality of each time slot to the control center via the transmission path, along with data indicating the time slot selected by the base station, wherein the control center includes: a reception module configured to receive the output power data, the reception quality data, and the data indicating the time slot from the base station; and a construction module configured to construct adjacent base station data indicating adjacency relationship between the base stations by comparing the reception quality and the output power of each of the base stations, the reception quality being obtained by converting the reception quality data based on the time slot.

According to another aspect of the present invention, it is provided that a control center used in a wireless communication system, the system including a plurality of base stations and a control center, the base station being configured to transmit control data used to contain a mobile terminal via a control channel in a time slot selected from plurality of time slots autonomously, the control center being configured to connect to the base station via a transmission path so as to control the base station, the control center including: a reception module configured to receive output power data, reception quality data, and data indicating a time slot, the output power data indicating output power of the base station transmitted via the transmission path from the base station, the reception quality data indicating reception quality of each time slot measured by received radio signals of control data transmitted from other base stations via the control channel, the data indicating the time slot being selected by the base station; and a construction module configured to construct adjacent base station data indicating adjacency relationship between base stations by comparing the reception quality with the output power of each of the mobile base stations, the reception quality being obtained by converting the reception quality data based on the time slot.

According to another aspect of the present invention, it is provided that a base station used in a wireless communication system including a plurality of base stations and a control center, the base station being configured to transmit control data used to contain a mobile terminal via a control channel in a time slot selected from plurality of time slots autonomously, the control center being configured to connect to the base station via a transmission path and control the base station, the base station including: notification module configured to notify the control center of output power data via the transmission path, the output power data indicating an output power of the base station; a measurement module configured to measure a reception quality of each time slot from received radio signals of control data transmitted from other base stations via the control channel; and a transmission module configured to transmit reception quality data indicating the reception quality of each time slot to the control center via the transmission path, along with data indicating the time slot selected by the base station.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described in detail with reference to the accompanying drawings.

Figure 1:
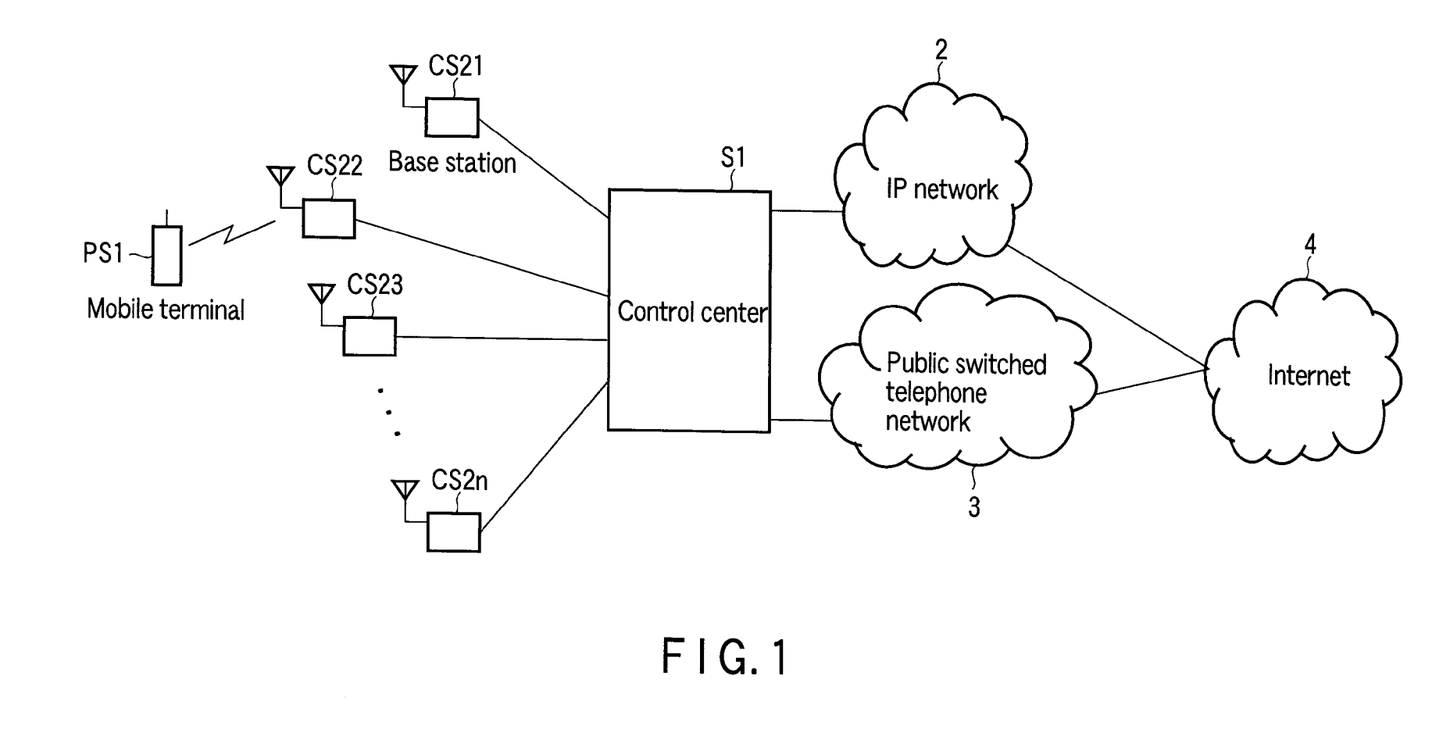
FIG. 1 is an overall configuration of a wireless communication system according to an embodiment of the present invention.

FIG. 1 illustrates an overall configuration of a wireless communication system according to an embodiment of the present invention. The wireless communication system includes base stations CS21 to CS2n (which will be collectively referred to as base station CS) and a control center S1.

The control center S1 is connected to a plurality of base stations CS via a cable, and controls the base stations CS. The control center S1 is further connected to an Internet Protocol (IP) network 2 and a public switched telephone network 3, as shown in FIG. 1, and is capable of performing communication via the Internet 4.

The base station CS transmits control data for servicing a mobile terminal PS1 via a control channel in an autonomously selected time slot.

The mobile terminal PS1 selects a destination base station CS based on the control data transmitted from the base station CS and communicates using a wireless protocol. The mobile terminal PS1 performs a hand-over process of switching the base station CS which is to be communicated with the mobile terminal PS1 according to movement of the mobile terminal PS1.

Hereinafter, detailed configurations and operations of the wireless communication system of the present invention will be described according to the embodiments.

First Embodiment

Figure 2:
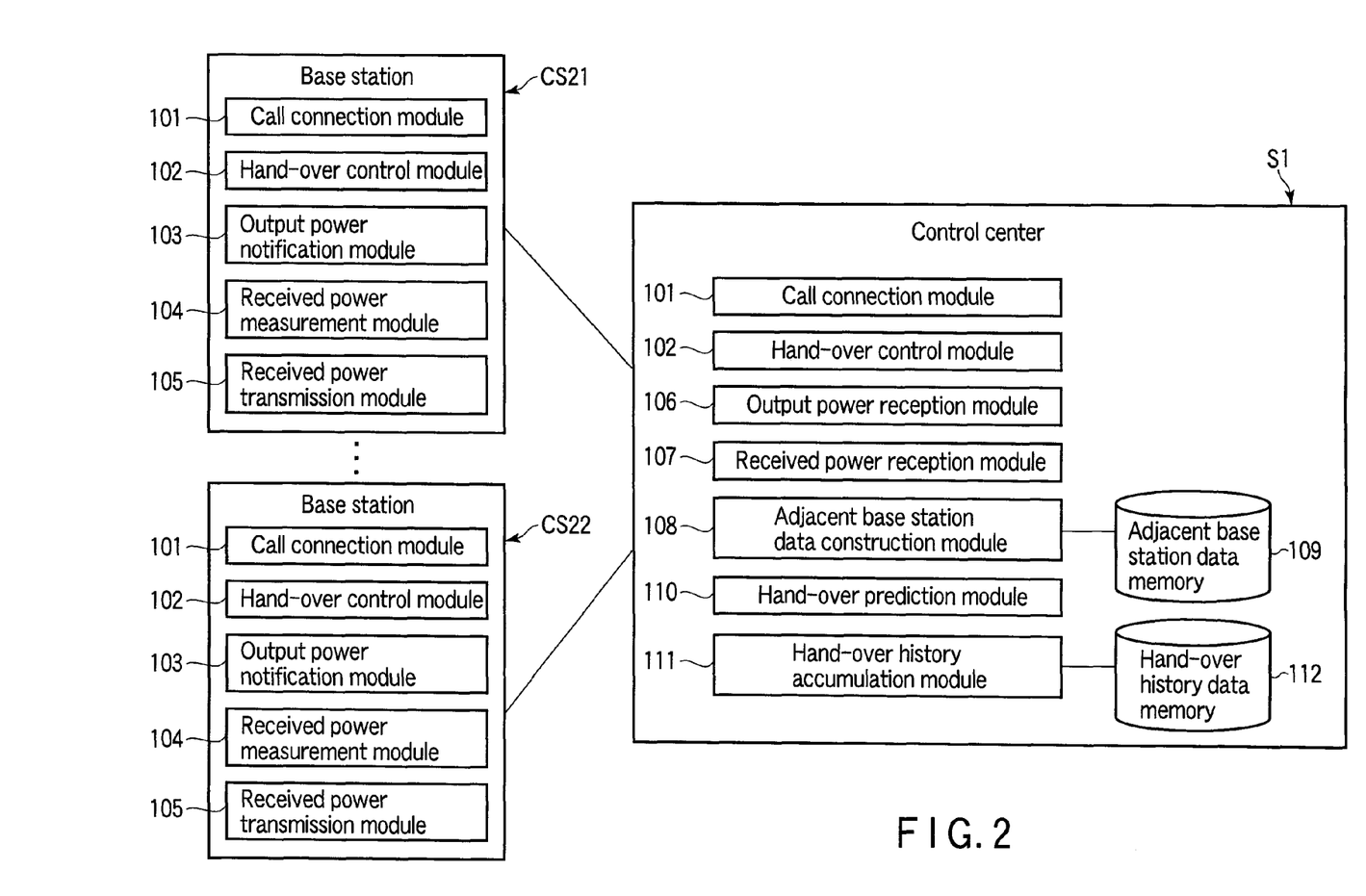
FIG. 2 is a functional block diagram illustrating an exemplary configuration of a wireless communication system according to the first embodiment.

FIG. 2 is a functional block diagram illustrating an exemplary configuration of a base station and a control center according to the first embodiment. In FIG. 2, the base station CS includes a call connection module 101, a hand-over control module 102, an output power notification module 103, a reception power measurement module 104, and a reception power transmission module 105.

The call connection module 101 performs call connection to the mobile terminal PS1.

The hand-over control module 102 performs control so as to switch the connection destination of the mobile terminal PS1 to another base station CS, when the quality of communication between the base station CS and the mobile terminal PS1 has deteriorated.

The output power notification module 103 transmits output power data indicating output power (maximum output power, for example) output by the base station CS to the control center S1 upon activation. It is to be noted that the output power may be the strength of radio signals, as well as electric power represented by W, dBm, or the like.

The reception power measurement module 104 measures the reception power of the radio signals transmitted by other base stations by searching the control channel in each time slot, and selects a time slot in which the control data of the base station should be transmitted. It is to be noted that the reception power to be measured may be the strength of electric field represented by V/m or dBV/m, for example, or other radio signals, as well as electric power represented by W or dBm.

The reception power transmission module 105 transmits reception power data indicating the reception power in each time slot and measured by the reception power measurement module 104 to the control center S1, along with the data indicating the selected time slot.

The control center S1, on the other hand, includes a call connection module 101, a hand-over control module 102, an output power reception module 106, a reception power reception module 107, an adjacent base station data construction module 108, an adjacent base station data memory 109, a hand-over prediction module 110, a hand-over history accumulation module 111, and a hand-over history data memory 112.

The output power reception module 106 receives the output power data transmitted from each of the base stations CS.

The reception power reception module 107 receives the reception power data and the data indicating the selected time slot transmitted by each of the base stations CS.

The adjacent base station data construction module 108 converts the reception power data received by the reception power reception module 107 into the reception power of each of the base stations CS based on the time slot, and compares the converted reception power and the output power of each of the base stations CS so as to construct adjacent base station data indicating adjacency relationship between the base stations.

The adjacent base station data memory 109 holds the adjacent base station data constructed by the adjacent base station data construction module 108.

The hand-over prediction module 110 predicts a base station that should be a candidate to which the next hand-over of the mobile terminal PS1 should be conducted, with reference to the adjacent base station data memory 109.

The hand-over history accumulation module 111 accumulates hand-over history data indicating a history of the destination base station CS whenever the mobile terminal PS1 performs hand-over.

The hand-over history data memory 112 holds hand-over history data accumulated by the hand-over history accumulation module 111. The hand-over history data memory 112 may include the period of time during which communication with the base station CS is performed, as well as the data on the destination base station CS. It is to be noted that the type (such as HDD and DRAM) of the storage is not specified.

Figure 3:
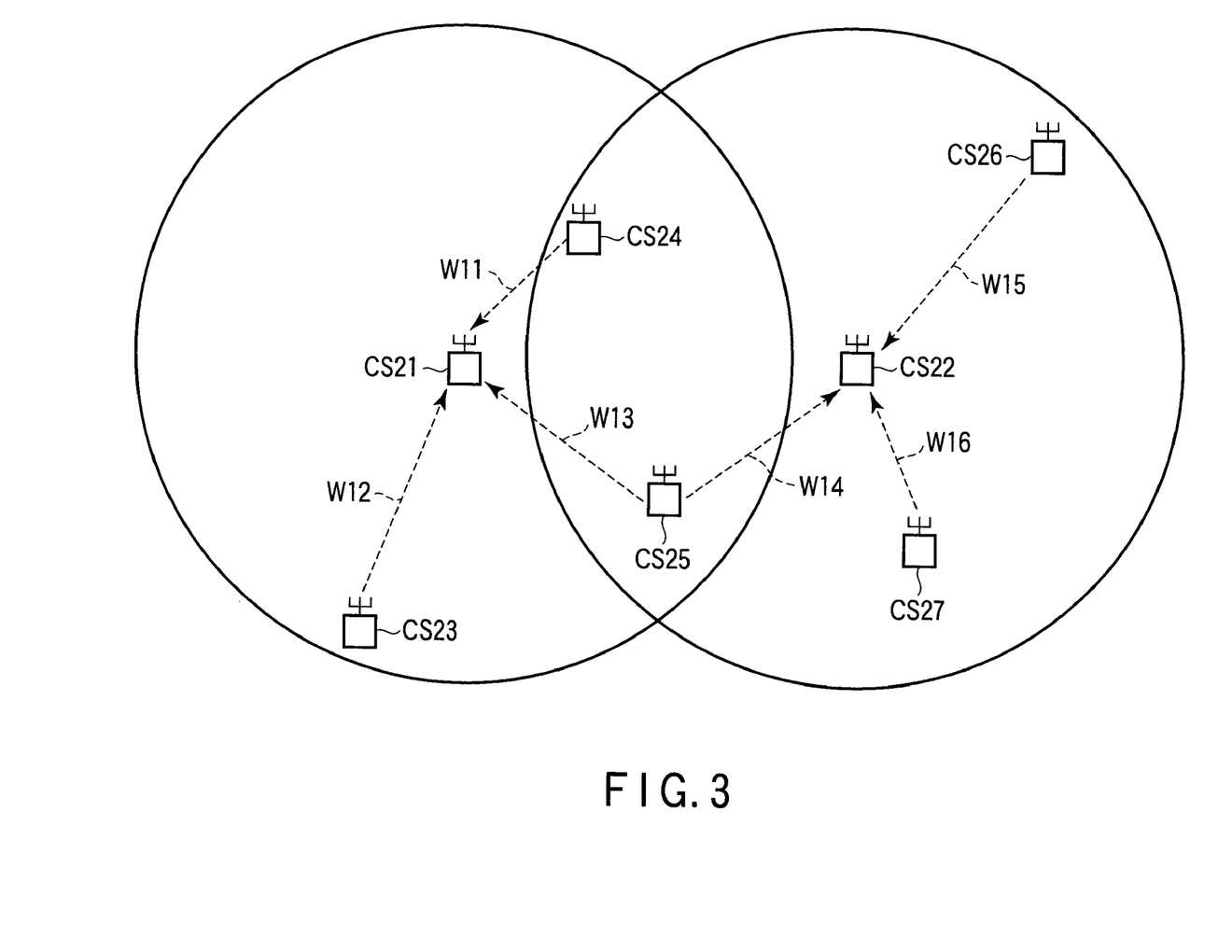
FIG. 3 illustrates received radio signals of control data transmitted via a control channel from other base stations.

FIG. 3 illustrates received radio signals of control data transmitted via a control channel from other base stations. As shown in FIG. 3, base station CS21 receives radio signals W11, W12, W13 from other base stations CS23, CS24, CS25 in the communication area. Similarly, base station CS22 receives radio signals W14, W15, W16 from other base stations CS25, CS26, CS27, respectively, in the communication area. Base stations CS21, CS22 measure the reception power of the radio signals by causing the reception power measurement module 104 to search the control channel in each time slot.

Hereinafter, periodicity of the control channel transmitted by the base station CS will be described, in FIG. 4. In the present embodiment, the base station CS transmits a control channel in a cycle of 1.2 seconds, and synchronization is maintained by a synchronization signal transmitted from the control center S1. The base station CS detects an unused time slot from a division (time slot) obtained by dividing the cycle of the control channel into 5 millisecond intervals, and autonomously selecting the detected one as a time slot for the base station CS. In this case, the selected time slot should not overlap with those of the other base stations. Utilizing the fact that the time slot selected by each of the base stations CS always has the same cycle (of 1.2 seconds), other base stations existing in the communication area can be searched for by retrieving a control channel having the cycle of 1.2 seconds.

Figure 4:
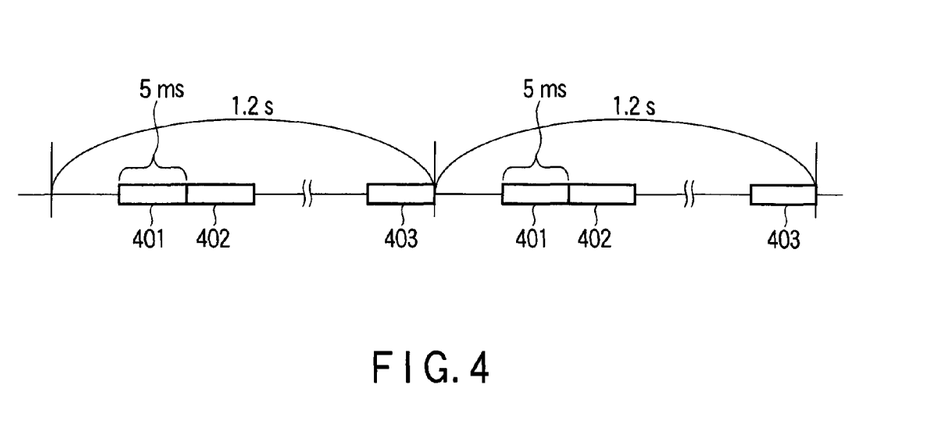
FIG. 4 illustrates periodicity of a control channel of a base station.

Referring to FIG. 4, assuming that the division 401 is the time slot in which base station CS23 of FIG. 3 transmits, the division 402 is the time slot in which base station CS24 of FIG. 3 transmits, and the division 403 is the time slot in which base station CS25 of FIG. 3 transmits, the cycles are always of 1.2 seconds. The adjacent base station data construction module 108 uses this periodicity in generating the adjacent base station data.

Figure 5A:
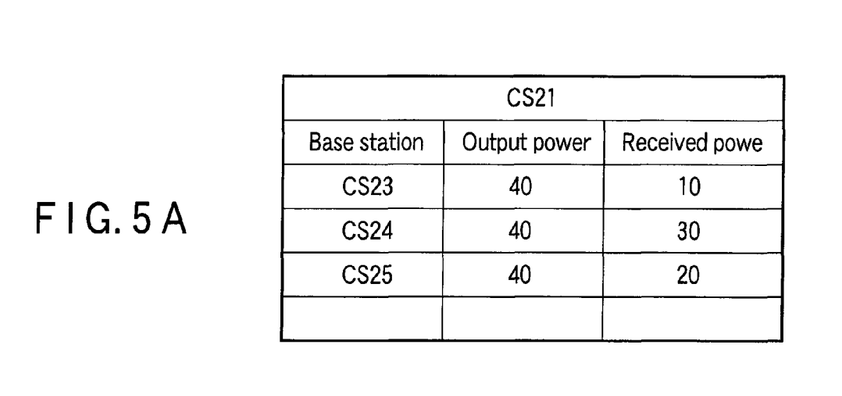
FIGS. 5A and 5B illustrate an example of adjacent base station data constructed based on reception power data.
Figure 5B:
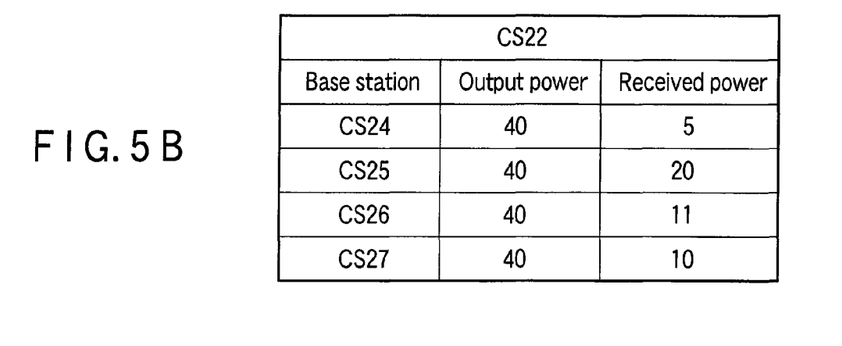

FIGS. 5A and 5B illustrate an example of adjacent base station data constructed based on the reception power data. Each of the base stations CS causes the reception power transmission module 105 to notify the control center S1 of the reception power data indicating the reception power in each time slot, along with data indicating the time slot of the control channel selected by each of the base station CS. Thereby, the control center S1 recognizes which of the base stations CS uses the time slot of the control channel.

The adjacent base station data construction module 108 calculates approximate positional relationship between the base stations based on the reception power data. FIG. 5A illustrates adjacent base station data obtained by converting the reception power data received by the control center S1 from base station CS21 of FIG. 3 into a reception power of each of the base stations, based on the time slot of the control channel, and associating the converted reception power with the output power notified from the base station. FIG. 5A shows that base station CS21 has received radio signals of reception power 10 from base station CS23, radio signals of reception power 30 from base station CS24, and radio signals of reception power 20 from base station CS25. Similarly, FIG. 5B shows that base station CS22 has received radio signals of reception power 5 from base station CS24, radio signals of reception power 20 from base station CS25, radio signals of reception power 11 from base station CS26, and radio signals of reception power 10 from base station CS27.

Further, the output power transmitted by base stations CS23, CS24, CS25 is equally 40, base station CS24 is assumed to be the closest to base station CS21, and base station CS23 is assumed to be the farthest from the base station CS21. Further, based on the adjacent base station data of base stations CS21, CS22, it can be calculated that the base station CS25 is located in an intermediate point between base station CS21 and base station CS22, and that base stations CS26, CS27 are separated from base station CS21. Using such data, approximate positional relationship between the base stations CS of FIG. 3 can be reconstructed.

Further, the adjacent base station data construction module 108 is capable of calculating the distance between the base stations based on the reception power data and the output power data. For example, assuming that the distance is x, the output power of the base station CS is max, and the reception power of radio signals from another base station is y, the distance can be calculated by the following formula:

$$x = \sqrt{\max - y}$$

The data indicating the distance calculated in this way can be held in the adjacent base station data memory 109 as adjacent base station data, instead of the reception power data (or together with the reception power data).

Figure 6:
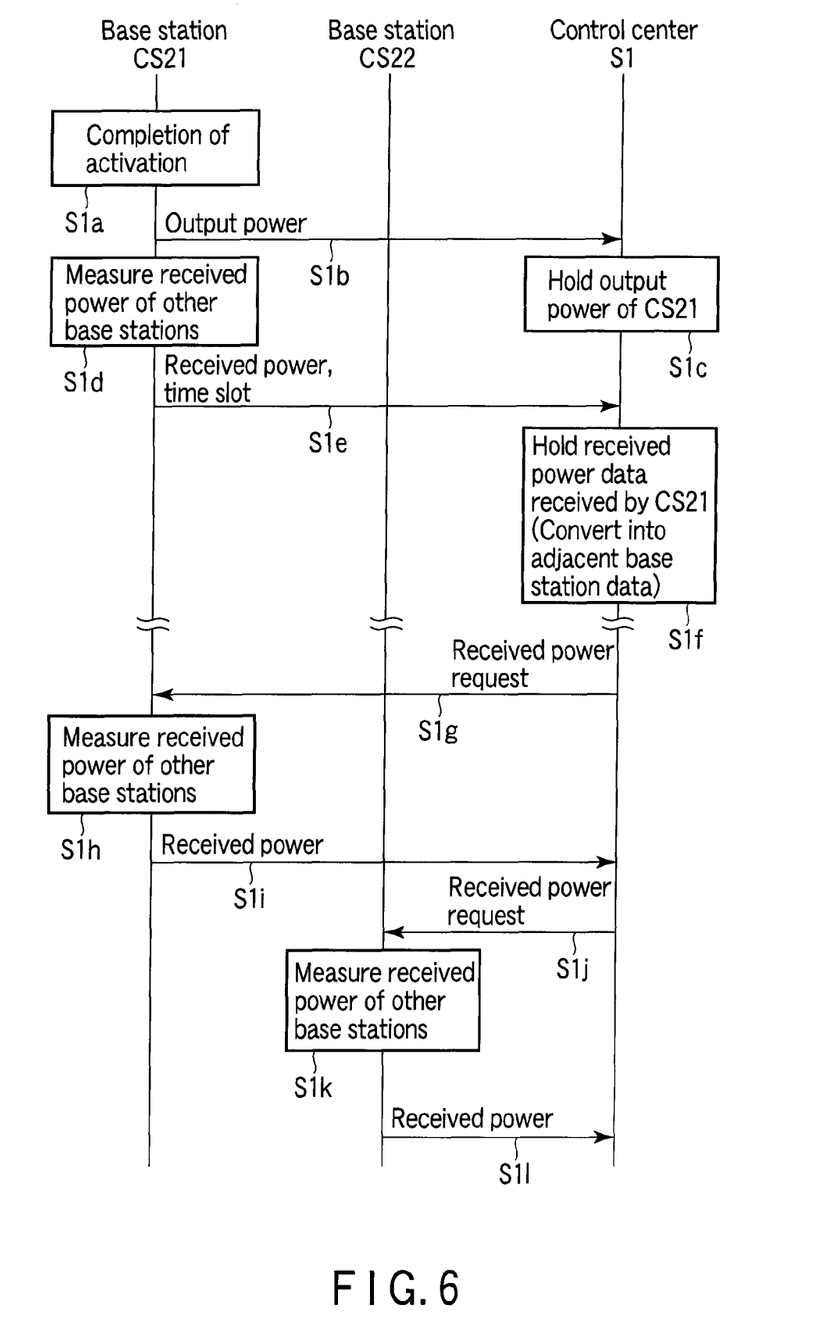
FIG. 6 is a sequence diagram illustrating an operation of the wireless communication system of FIG. 2.

FIG. 6 is a sequence diagram illustrating an operation of the wireless communication system.

Upon completion of activation (S1a), base station CS21 causes the output power notification module 103 to notify the control center S1 of the output power data indicating the output power transmitted by base station CS21 (S1b). The control center S1 causes the output power reception module 106 to receive the output power data notified from CS21 and hold the output power data (S1c).

Following that, base station CS21 causes the reception power measurement module 104 to measure the reception power of radio signals transmitted by other base stations CS (Sid) by searching the control channel in each time slot, and select a time slot in which base station CS21 should transmit. The reception power data indicating the measured reception power is transmitted to the control center S1, together with the data indicating the selected time slot, by the reception power transmission module 105 (S1e). Thereby, the control center S1 converts the reception power data into the reception power of each base station based on the time slot notified from each of the base stations, and constructs adjacent base station data by comparing the converted reception power with the output power (S1f).

Since it is also possible that the adjacent base station may change due to removal or breakdown of the base station CS, the control center S1 periodically requests base stations CS21, CS22 of reception power data (S1g, S1j). Upon receipt of the request, base stations CS21, CS22 cause the reception power measurement module 104 to measure reception power in each time slot from the received radio signals of the control channel (S1h, S1k), and transmits the reception power data to the control center S1 (s1i, S1l). By making the request from the control center S1 not in parallel with the requests from the other base stations CS, it is possible to prevent the state in which all the base stations CS are out of communication.

Figure 7:
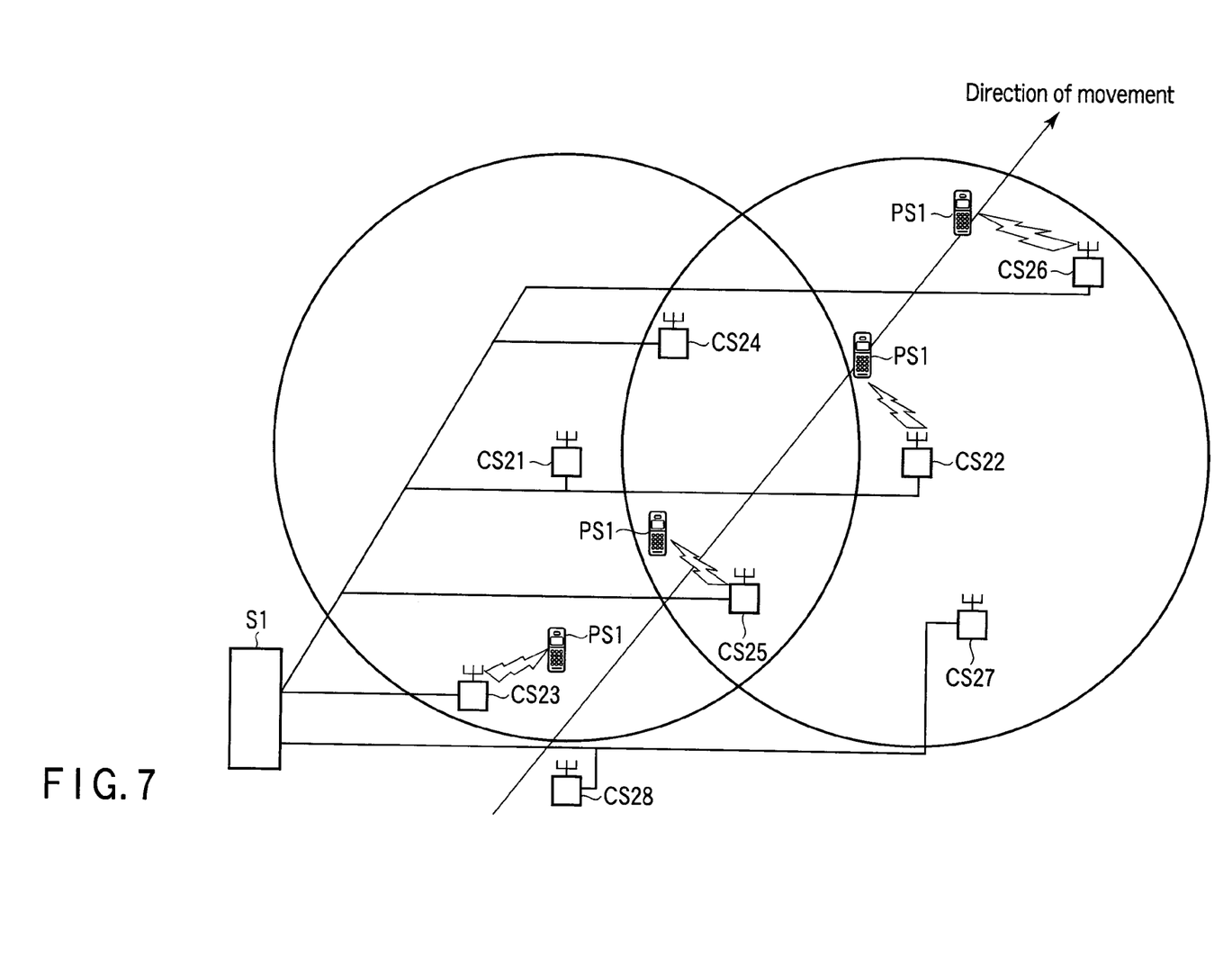
FIG. 7 illustrates a hand-over prediction process.

FIG. 7 illustrates a hand-over prediction process using adjacent base station data.

Figure 8:
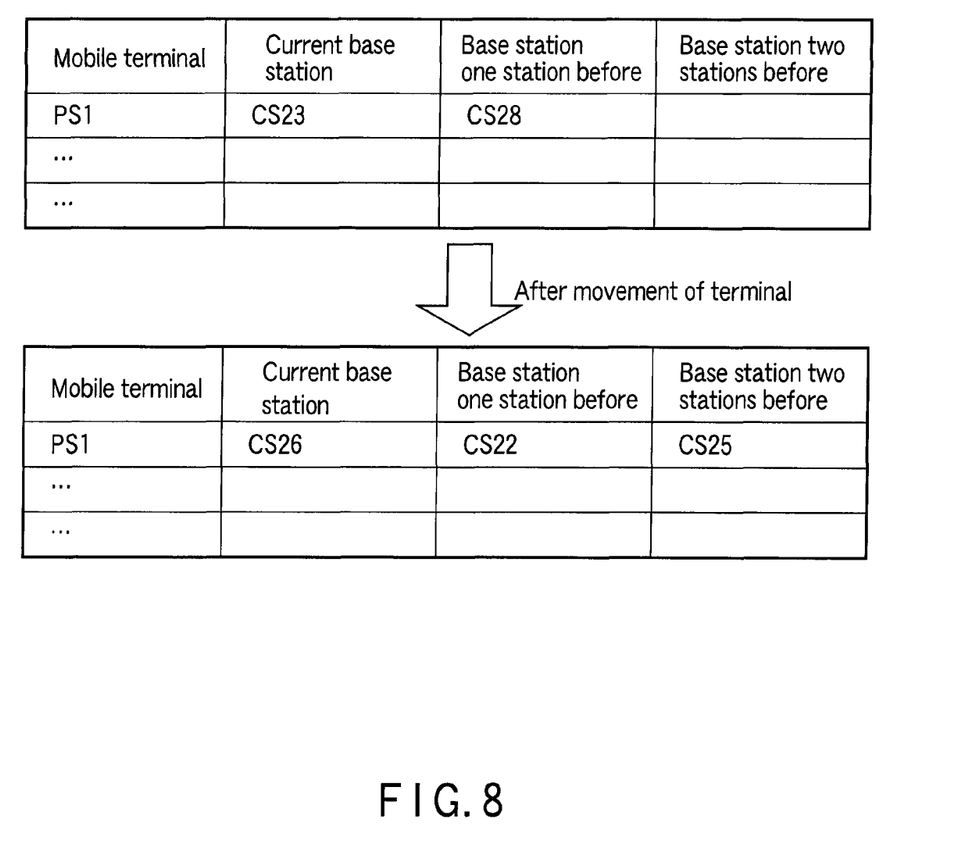
FIG. 8 illustrates an example of hand-over history data.

All the base stations CS are connected to the control center S1 via cables. FIG. 7 shows the state in which the mobile terminal PS1 is serviced by base station CS23 at first, and moves in the direction of base station CS26 as time advances. In the control center S1, the hand-over history accumulation module 111 accumulates data indicating the history of the destination base station CS in the hand-over history data memory 112, whenever the mobile terminal PS1 performs hand-over. FIG. 8 shows an example of the hand-over history data.

The hand-over prediction module 110 decides that the mobile terminal PS1 has moved in the direction of base station CS23 from base station CS28, based on the hand-over history data shown in the upper part of FIG. 8. The hand-over prediction module 110 recognizes that base station CS21 and base station CS25 are located in the proximity of base station CS23, based on the constructed adjacent base station data, and predicts that there is high possibility that hand-over will be performed to one of these base stations. In contrast, the hand-over prediction module 110 recognizes that base station CS24 is in a position far from base station CS23, and predicts that there is low possibility that hand-over will be performed to base station CS24.

Further, since it can be judged that the base station from which base station CS23 receives stronger power is closer to the base station, the hand-over prediction module 110 selects base station CS25 from which base station CS23 receives the strongest power as a candidate to which hand-over is to be conducted.

Similarly, after predicting the next base station to which hand-over is conducted from base station CS25, the hand-over prediction module 110 predicts that there is high possibility that hand-over is to be conducted to one of base stations CS21, CS22, CS24, based on the adjacent base station data. Further, the hand-over prediction module 110 selects base station CS22, from which the strongest power is received, as a candidate to which hand-over is to be conducted. As the mobile terminal PS1 moves, the hand-over history data will be updated as shown in the lower part of FIG. 8.

It is to be noted that, although the hand-over prediction module 110 has selected a candidate to which hand-over is to be conducted according to the strength of the reception power in the present embodiment, a base station having a large amount of remaining resources (vacant spectrum in communication channel) may be selected, when there is no big difference in the value of the reception power.

Second Embodiment

Figure 9:
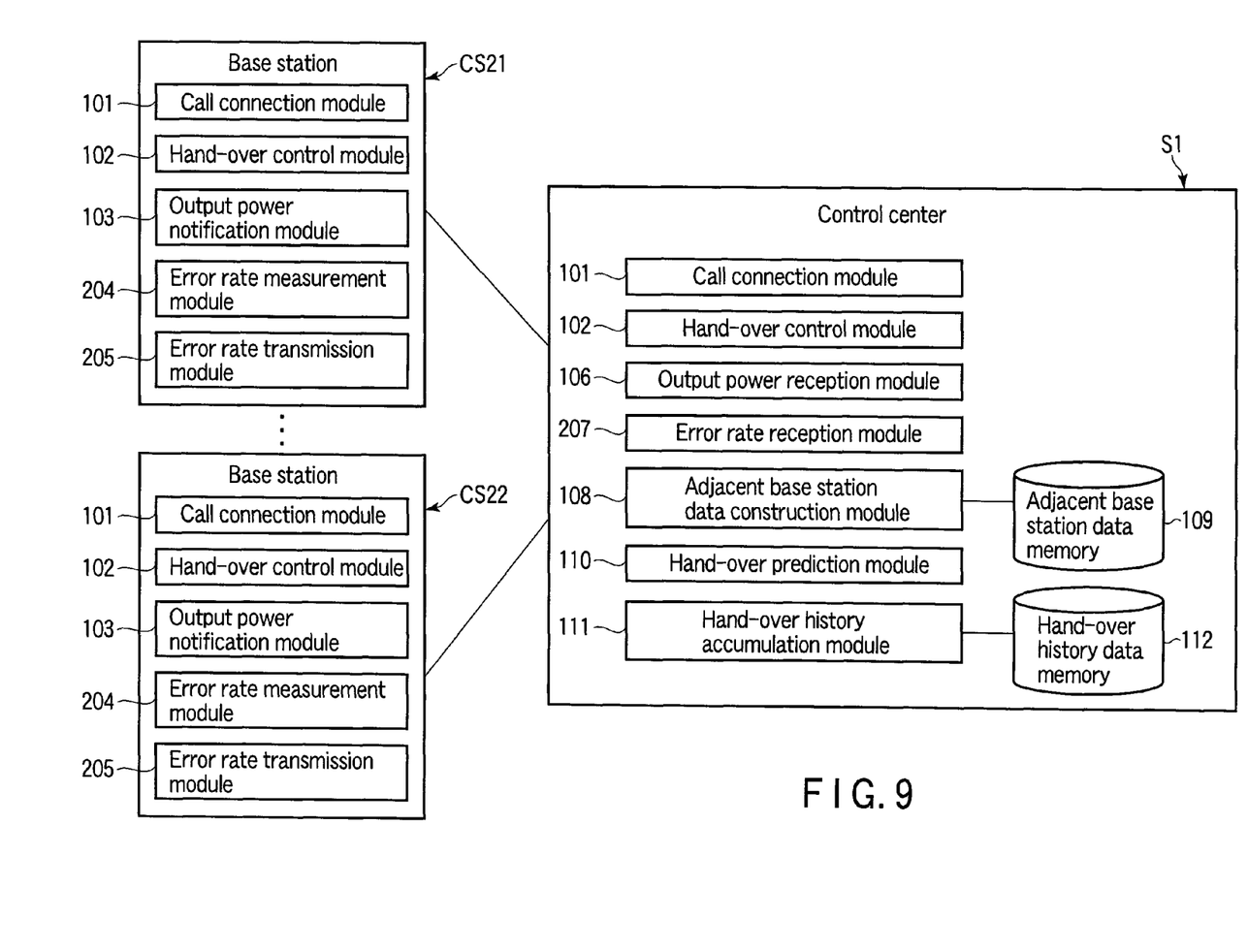
FIG. 9 illustrates a functional block diagram illustrating an exemplary configuration of a wireless communication system according to the second embodiment.

FIG. 9 is a functional block diagram illustrating an exemplary configuration of a base station and a control center, according to the second embodiment. The base station CS of FIG. 9 includes an error rate measurement module 204 and an error rate transmission module 205, instead of the reception power measurement module 104 and the reception power transmission module 105 of FIG. 2. Further, the control center S1 of FIG. 9 includes an error rate reception module 207, instead of the reception power reception module 107 of FIG. 2. In FIG. 9, the structural elements same as those of FIG. 2 are denoted by the same reference numbers, and detailed descriptions of such elements will be omitted.

In the base station CS, the error rate measurement module 204 measures an error rate of radio signals transmitted from other base stations by searching the control channel in each time slot, and selects a time slot in which control data of the base station CS should be transmitted.

The error rate transmission module 205 transmits error rate data indicating an error rate of each time slot measured by the error rate measurement module 204 to the control center S1, together with the selected data indicating the time slot.

The error rate reception module 207 receives error rate data transmitted from each of the base stations CS and data indicating the selected time slot.

The adjacent base station data construction module 108 converts the error rate data received by the error rate reception module 207 into the error rate of the base station CS based on the time slot, and constructs adjacent base station data indicating adjacency relationship between base stations, based on the relationship between the converted error rate and the output power of each of the base stations CS.

Figure 10A:
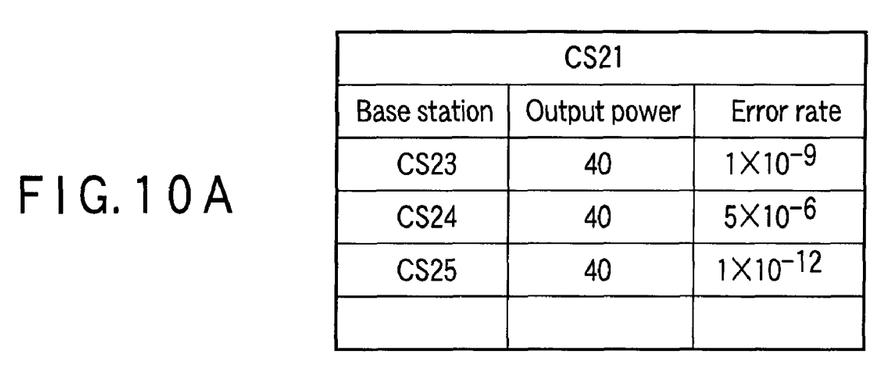
FIGS. 10A and 10B illustrate an example of adjacent base station data constructed based on error rate data.
Figure 10B:
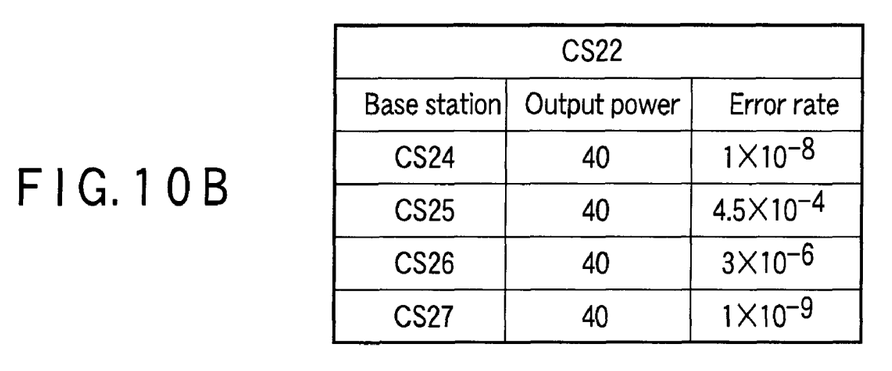

FIGS. 10A and 10B illustrate an example of adjacent base station data constructed using an error rate instead of the reception power. For example, FIG. 10A shows error rate data that is received by the control center S1 from base station CS21, converted into the error rate of each base station based on the time slot of the control channel, and associated with the output power notified from the base station. Referring to FIG. 10A, since the output power transmitted by base stations CS23, CS24, CS25 is equal, it can be decided that the base station with the lower error rate is closer to base station CS21. Accordingly, base station CS25 is assumed to be the closest to base station CS21, and base station CS24 is assumed to be the farthest from base station CS21.

Although there is no general relation between the error rate and the distance, an index indicating the distance between the base stations can be derived using the following formula:

$$x = \sqrt{max \times Err},$$

where the index indicating the distance is x, the output power of the base station is max, and the error rate of the radio signals received from other base stations is Err.

Although the exact distance data cannot be known from this formula, a relative distance relationship between the base stations can be derived. The data indicating a distance calculated in this way may be held in the adjacent base station data memory 109 as the adjacent base station data, instead of the error rate data (or together with the error rate data).

Figure 11:
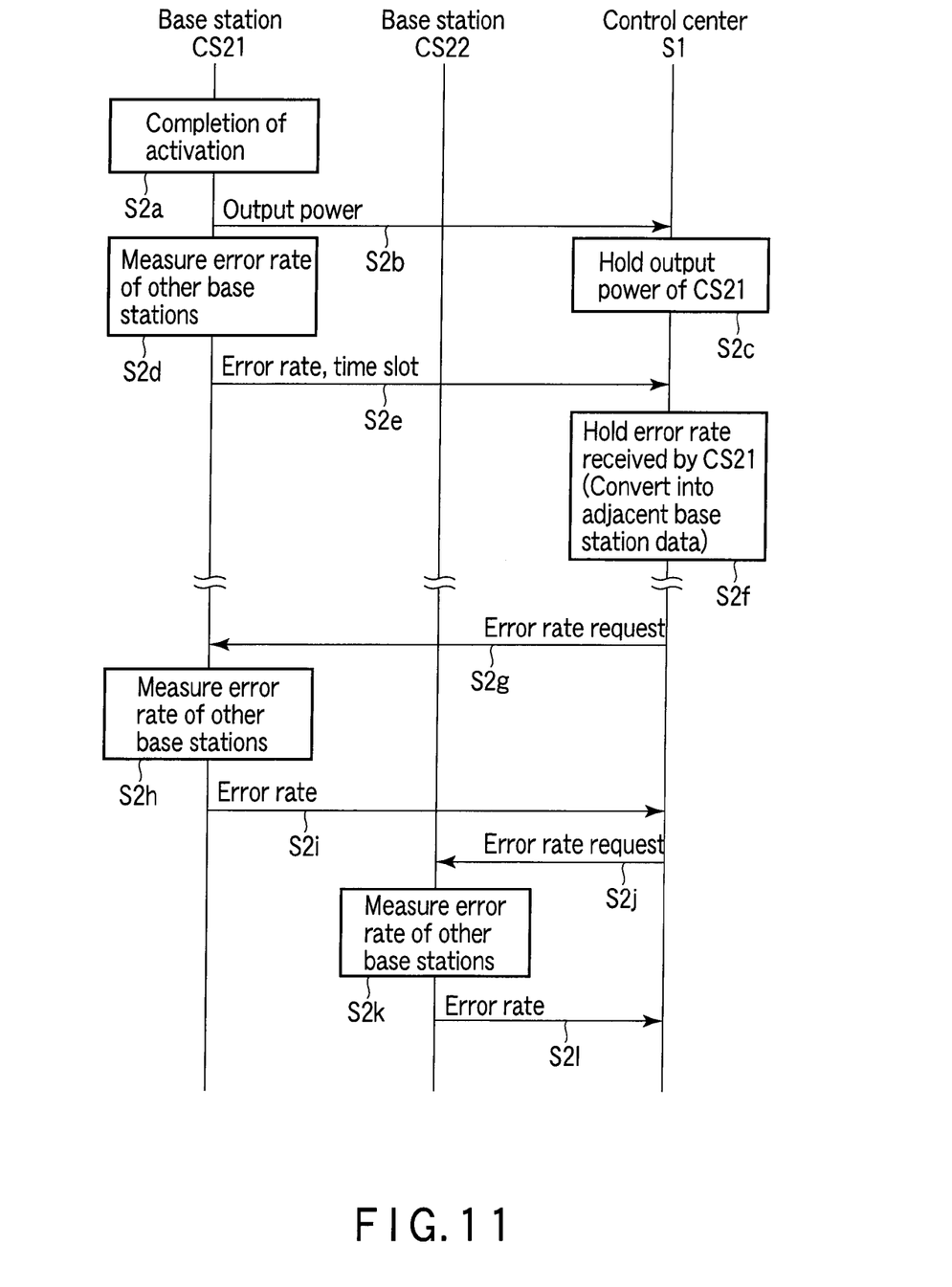
FIG. 11 is a sequence diagram illustrating an operation of the wireless communication system of FIG. 9.

FIG. 11 is a sequence diagram illustrating the operation of the wireless communication system of FIG. 9.

Upon completion of activation (S2a), base station CS21 causes the output power notification module 103 to notify the control center S1 of the output power data indicating the output power transmitted by base station CS21. The control center S1 causes the output power reception module 106 to receive output power data notified from base station CS21, and hold the notified output power data (S2c).

Following that, base station CS21 causes the error rate measurement module 204 to measure the error rate of radio signals transmitted by other base stations CS by searching the control channel in every time slot (S2d), and selects a time slot in which base station CS21 should transmit. The error rate data indicating the measured error rate is transmitted by the error rate transmission module 205 to the control center S1, together with the data indicating the selected time slot (S2e). Thereby, the control center S1 converts the error rate data into the error rate of each of the base stations, based on the time slot notified from the base station, and constructs the adjacent base station data based on the relationship between the error rate and the output power (S2f).

Since it is also possible that the adjacent base station may change due to removal or breakdown of the base station CS, the control center S1 periodically requests base stations CS21, CS22 of error rate data (S2g, S2j). Upon receipt of the request, base stations CS21, CS22 cause the error rate measurement module 204 to measure the error rate in each time slot from the received radio signals of the control channel (S2h, S2k), and transmits the error rate data to the control center S1 (S2i, S2l). By making the request from the control center S1 not in parallel with the requests from the other base stations CS, it is possible to prevent the state in which all the base stations CS are out of communication.

Further, in the second embodiment, the hand-over prediction module 110 predicts a candidate base station to which the next hand-over of the mobile terminal should be conducted, based on the constructed adjacent base station data. Since it can be decided that the base station with the lower error rate in the constructed adjacent base station data is closer to the base station, the hand-over prediction module 110 selects a base station with the lowest error rate as a candidate to which the next hand-over is to be conducted. It is to be noted that the hand-over prediction module 110 may select a base station having a large amount of remaining resources (vacant spectrum in communication channel) when there is no big difference in the value of error rate.

Accordingly, according to the embodiments, the control center is capable of constructing adjacent base station data without depending on terminals. Further, the adjacent base station data can be constructed immediately after installation of a new base station.

Additional advantages and modifications will readily occur to those skilled in the art. Therefore, the invention in its broader aspect is not limited to the specific details and representative embodiments shown and described herein. Accordingly, various modifications may be made without departing from the spirit of scope of the general inventive concept as defined by the appended claims and their equivalents.

What is claimed is:

1. A wireless communication system comprising a plurality of base stations and a control center, the base station being configured to transmit control data used to service a mobile terminal via a control channel in a time slot selected from plurality of time slots autonomously, the control center being configured to connect to the base station via a transmission path and control the base station, the base station comprising:

a notification module configured to notify the control center of output power data via the transmission path, the output power data indicating an output power of the base station;

a measurement module configured to measure a reception quality of each time slot from received radio signals of control data transmitted from other base stations via the control channel; and a transmission module configured to transmit reception quality data indicating the reception quality of each time slot to the control center via the transmission path, along with data indicating the time slot selected by the base station, wherein the control center comprises:

a reception module configured to receive the output power data, the reception quality data, and the data indicating the time slot from the base station; and a construction module configured to construct adjacent base station data indicating adjacency relationship between the base stations by comparing the reception quality and the output power of each of the base stations, the reception quality being obtained by converting the reception quality data based on the time slot.

2. The system according to claim 1, wherein the reception quality is determined based on a reception power.

3. The system according to claim 1, wherein the reception quality is determined based on an error rate.

4. A control center used in a wireless communication system, the system comprising a plurality of base stations and a control center, the base station being configured to transmit control data used to contain a mobile terminal via a control channel in a time slot selected from plurality of time slots autonomously, the control center being configured to connect to the base station via a transmission path so as to control the base station, the control center comprising:

a reception module configured to receive output power data, reception quality data, and data indicating a time slot, the output power data indicating output power of the base station transmitted via the transmission path from the base station, the reception quality data indicating reception quality of each time slot measured by received radio signals of control data transmitted from other base stations via the control channel, the data indicating the time slot being selected by the base station; and a construction module configured to construct adjacent base station data indicating adjacency relationship between base stations by comparing the reception quality with the output power of each of the mobile base stations, the reception quality being obtained by converting the reception quality data based on the time slot.

5. The control center according to claim 4, wherein the reception quality is determined based on a reception power.

6. The control center according to claim 4, wherein the reception quality is determined based on an error rate.

7. The control center according to claim 4, wherein the construction module calculates a distance between adjacent base stations based on the reception quality and the output power of each of the base stations.

8. The control center according to claim 4, further comprising a prediction module configured to predict a base station which is a candidate to which hand-over of the mobile terminal is to be conducted, based on the adjacent base station data.

9. The control center according to claim 8, wherein the prediction module selects a base station with the greatest reception power as a candidate to which hand-over of the mobile terminal is to be conducted, based on the adjacent base station data when the reception quality is determined based on the reception power.

10. The control center according to claim 8, wherein the prediction module selects the base station with the lowest error rate as a candidate for the hand-over based on the adjacent base station data when the reception quality is determined based on the error rate.

11. The control center according to claim 8, wherein the prediction module selects a base station that is to be a candidate to which hand-over is to be conducted, based on the adjacent base station data and a vacant spectrum of a communication channel of each of the base stations.

* * * * *